S. COOPER.
PACKAGING MACHINERY.
APPLICATION FILED APR. 16, 1915. RENEWED JUNE 21, 1918.

1,333,901.

Patented Mar. 16, 1920.
7 SHEETS—SHEET 1.

S. COOPER.
PACKAGING MACHINERY.
APPLICATION FILED APR. 16, 1915. RENEWED JUNE 21, 1918.
1,333,901. Patented Mar. 16, 1920.
7 SHEETS—SHEET 2.

S. COOPER.
PACKAGING MACHINERY.
APPLICATION FILED APR. 16, 1915. RENEWED JUNE 21, 1918.

1,333,901. Patented Mar. 16, 1920.
7 SHEETS—SHEET 4.

S. COOPER.
PACKAGING MACHINERY.
APPLICATION FILED APR. 16, 1915. RENEWED JUNE 21, 1918.

1,333,901. Patented Mar. 16, 1920.
7 SHEETS—SHEET 5.

Fig. 9.

Witnesses:
Mary H. Lewis
Helen V. Fitzpatrick

Inventor
Simon Cooper
By his Attorney
Frank J. Henk

UNITED STATES PATENT OFFICE.

SIMON COOPER, OF BROOKLYN, NEW YORK.

PACKAGING MACHINERY.

1,333,901.                Specification of Letters Patent.    Patented Mar. 16, 1920.

Application filed April 16, 1915, Serial No. 21,886. Renewed June 21, 1918. Serial No. 241,289.

*To all whom it may concern:*

Be it known that I, SIMON COOPER, a citizen of the United States, residing at Brooklyn, in the county of Kings and State of New York, have invented certain new and useful Improvements in Packaging Machinery, of which the following is a specification.

This invention concerns itself with automatic machinery of the packaging class, and aims more particularly to disclose an embodiment adapted to inwrap an oval piece, as a cake of soap of that form.

An important object of the invention sought to be attained is the disclosure of a novel and valuable train of coöperating and successively effective transportation devices, in combination with the parts designed to perform the folding of a wrapper about an oval cake, the insertion of the thus-wrapped cake into a tubular carton and the sealing of said carton.

Other objects and aims of the invention, more or less broader than those stated above, together with the advantages inherent, will be in part obvious and in part specifically referred to in the course of the following description of the elements, combinations, arrangements of parts, and applications of principles constituting the invention; and the scope of protection contemplated will appear from the claims.

In the accompanying drawings, which are to be taken as a part of this specification, and wherein is shown an assembly-and-detail embodiment as at present preferred.

Similar reference characters refer to similar parts throughout the several views of the drawings.

Figures 1, 2:
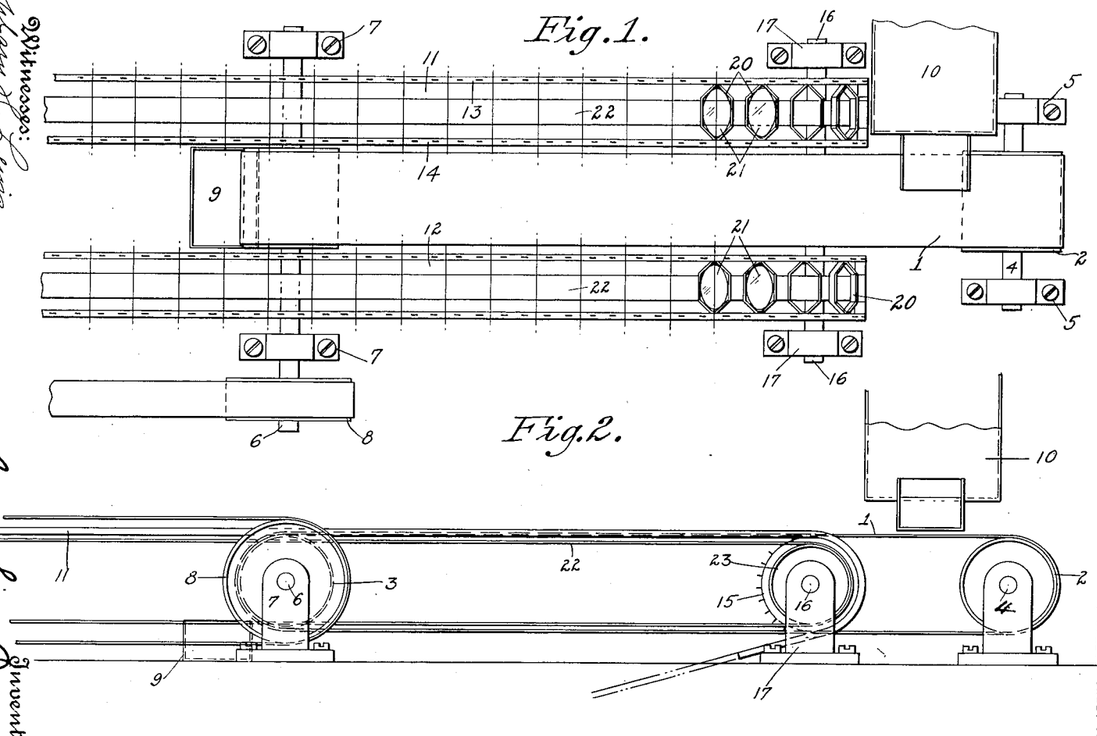
Figure 1 is a plan view of the soap feed conveyer to the wrapping machine.
Fig. 2 is a side elevation of the soap conveyer.

Referring to Fig. 1, the soap cakes are delivered from the cake-forming press 10 on to traveling belt 1, which is guided on pulleys 2 and 3. Pulley 2 is mounted on shaft 4 journaled in pillow blocks 5—5. Pulley 3 is mounted on shaft 6 which is journaled in pillow blocks 7—7, and this shaft has fastened to one end of same a drive-pulley 8 which receives power by being belted to a suitable source. A receptacle 9 is located at the discharge end of the conveyer belt to receive any of the soap which is not removed in time.

Situated parallel to the conveyer belt 1 and located on each side of same are conveyers 11 and 12. Treating of conveyer 11, which in this description is the only one which is being utilized, this is composed of two parallel chains 13 and 14 which are carried on the sprockets 15 arranged on shaft 16 journaled in pillow blocks 17 (Figs. 1 and 2).

Figure 3:
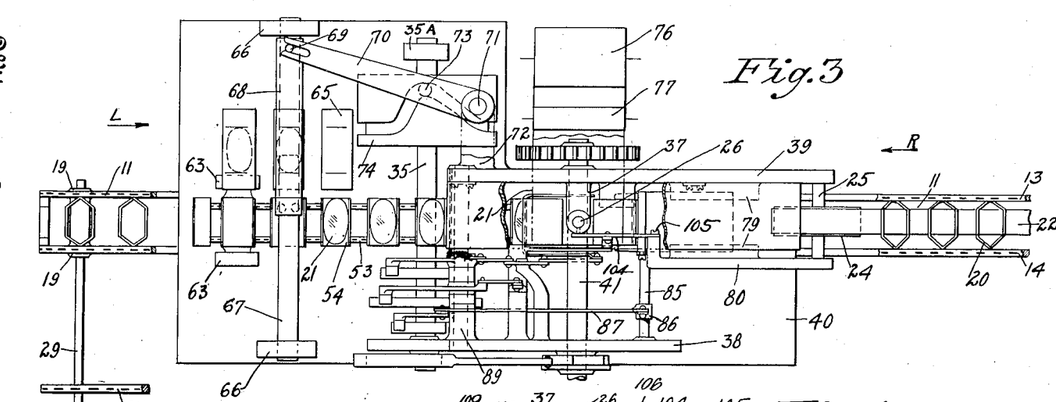
Fig. 3 is a plan view of the wrapping machine proper.
Figure 4:
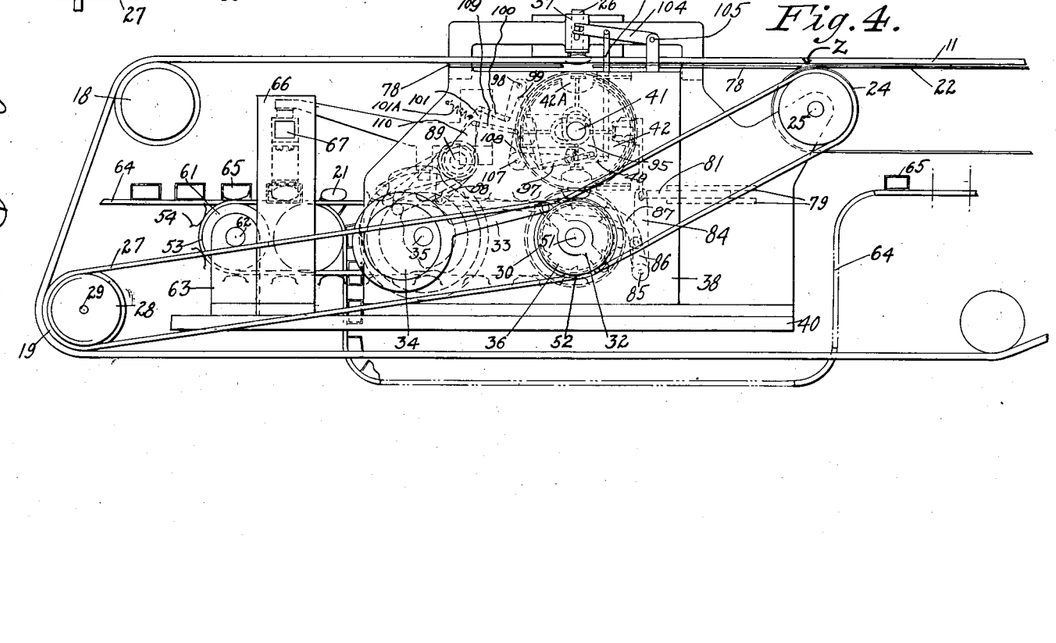
Fig. 4 is a side elevation of same.

These chains 13 and 14 continue over and past the wrapping machine shown in Figs. 3 and 4, lead around sprockets 18 beyond the wrapping machine and thence to sprockets 19 (Figs. 3 and 4) to return underneath the wrapping machine (Fig. 4) and on to sprockets 15 (Fig. 2).

A band 20, of a shape conforming more or less to the shape of the soap cake 21, is fastened to the links of chains 13 and 14 and is thus suspended between the two chains. The bands 20, being open on top and bottom, form a line of receptacles into which the cakes of soap are placed by an operator removing them from belt 1.

In order to prevent the cakes of soap dropping through the receptacles 20, a belt 22 traveling in unison with conveyer 11 and located just underneath said conveyer supports the cakes 21 during a portion of their travel (note the point Z in Fig. 4). The belt 22 is carried at one end by pulley 23 mounted on shaft 16 (Fig. 2) and returns around pulley 24 which is carried on shaft 25 (Fig. 4) held in the side frames 39 and 80 of the wrapping machine.

The conveyer 11 passes across the wrapping machine, (Figs. 3 and 4), and situated above the conveyer is a plunger 26.

Figure 5:
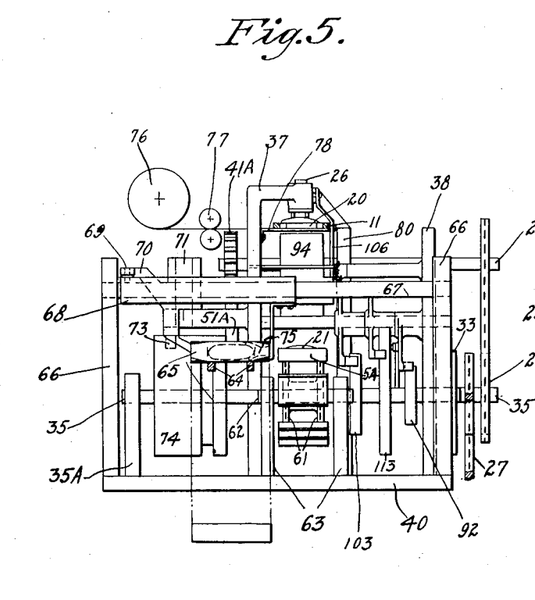
Fig. 5 is an elevation of Fig. 3 looking in the direction of the arrow L.
Figure 6:
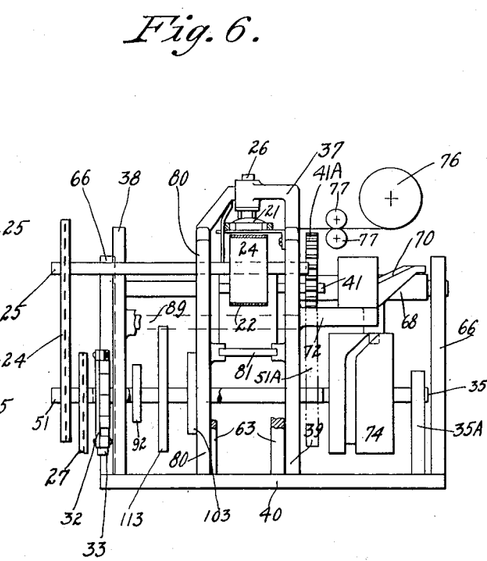
Fig. 6 is an end elevation of Fig. 3 looking in the direction of the arrow R.

The conveyer 11 receives an intermittent motion by means of sprocket chain 27 passing around sprocket 28 which is located on shaft 29 and around sprocket 30 which is fastened upon shaft 51 (Fig. 4). Shaft 51 receives an impulse by means of a pawl on lever 32 which is connected to eccentric 33 (Figs. 4, 5 and 6). Eccentric 33, being mounted on eccentric cam 34, which is on shaft 35, for each revolution of shaft 35 will cause the ratchet pawl on the lever 32 will cause the ratchet wheel 36 to advance one tooth, which, through the sprockets 30 and 28 and chain 27, will result in advancing the conveyer 11 the distance occupied by one receptacle 20 and then halting the receptacle immediately under plunger 26.

Figure 9:
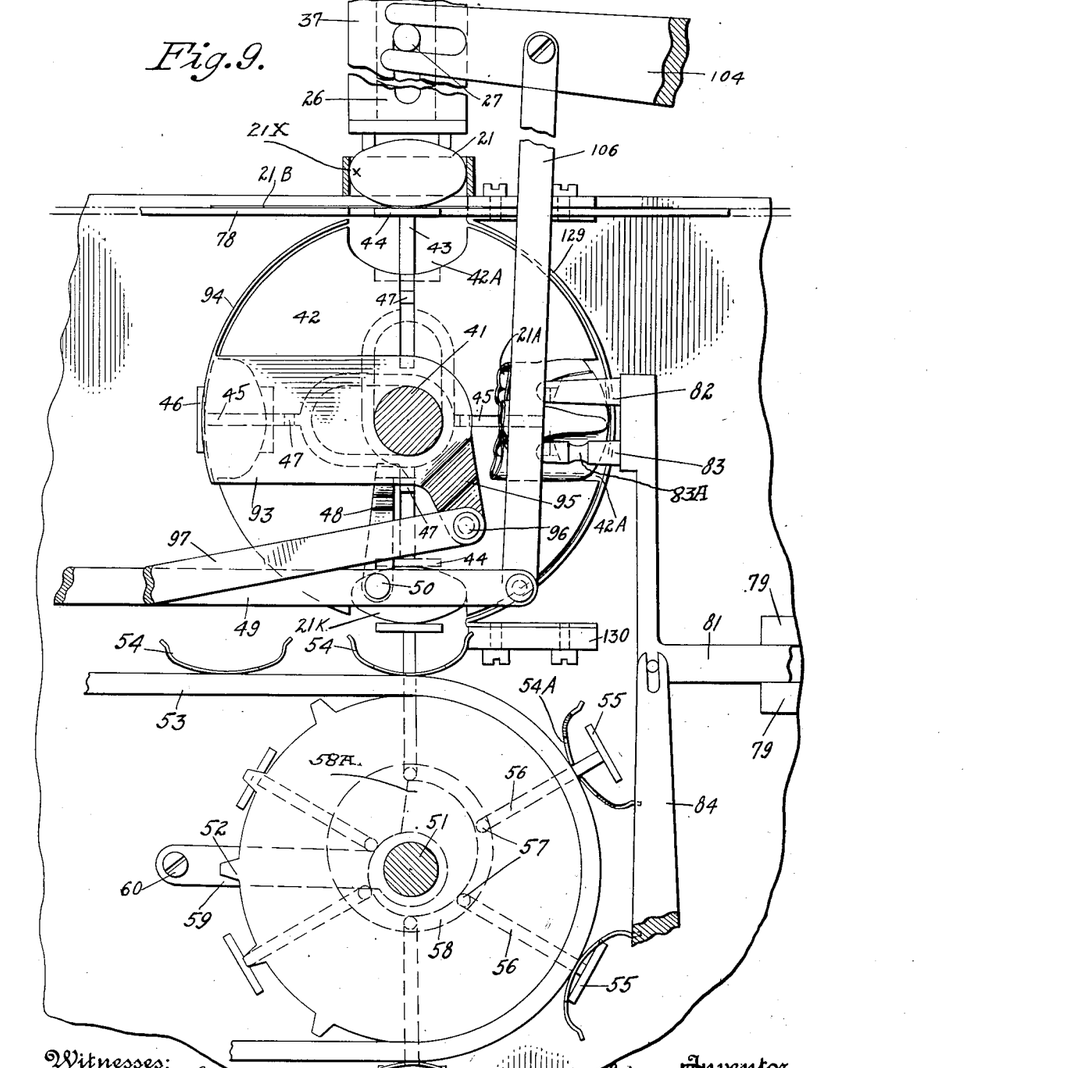
Fig. 9 is a sectional view of parts of the mechanism shown in Figs. 3 and 4.

The plunger 26 is guided in a bracket 37 extending from side frame 39 (Figs. 3, 4, 5 and 6). Side frame 38 parallels side frame 39 and both are fastened to base plate 40. A shaft 41 to which is fastened gear 41A (Fig. 5) is supported in bearings in these side frames. A drum 42, also fixedly carried by said shaft 41 (Fig. 4 and particularly Figs. 9 and 10), has four recesses 42A in its periphery spaced equally apart, which recesses each conform to the under half of the soap cake and are just deep enough to receive the entire cake so that the top of the cake is on the outside of the radius line of said drum. A rod 43 (Figs. 4 and 9) is capable of moving in guide ways in drum 42, and the length of said rod with the pads 44 is somewhat longer than the diameter of the drum minus the depth of one of the recesses 42A. A similar rod 45, with its pads 46, is arranged on the drum at right angles to rod 43 (Fig. 9). The pads 44 and 46 are disposed in the middle divisions of the recesses 42A (Fig. 10).

Figure 10:
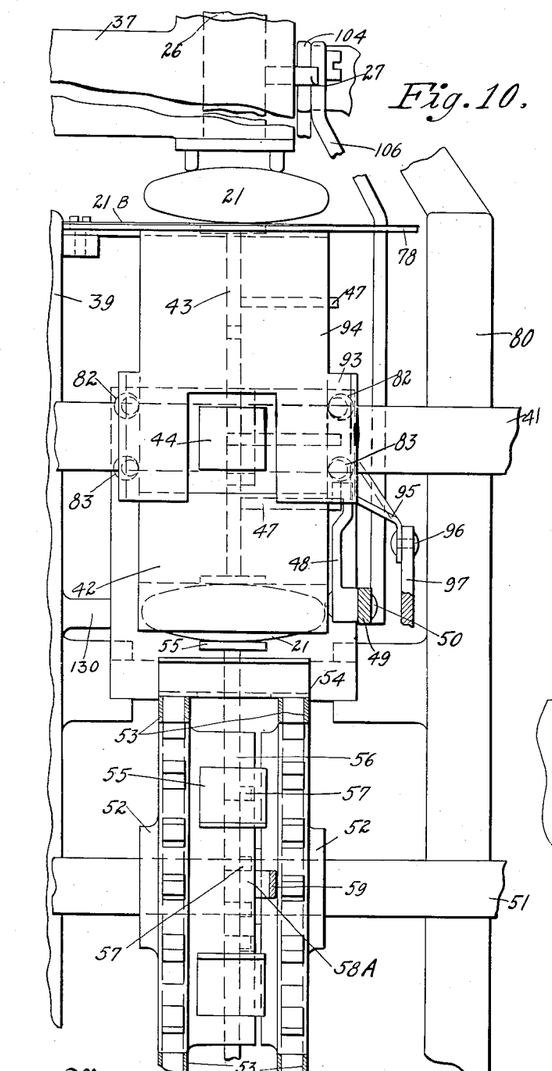
Fig. 10 is an end elevation of the parts shown in Fig. 9.

At a fixed distance from each pad on rods 43 and 45 is a pin 47 extending at right angles to its rod (Figs. 9 and 10). A hook 48 (said Figs. 9 and 10) is in the path of successive pins 47 as drum 42 rotates and is so arranged as to permit the then lowermost pin, which in this location is withdrawn near to the central axis of the drum 42 (Fig. 9) to engage with hook 48. As the drum 42, which has an intermittent motion for each quarter of its circumferential travel, stops, the hook 48 is pulled down by the lever 49 acting through the stud 50. (See Fig. 9 and also preliminarily at its point, note Fig. 13 in connection especially with Fig. 4).

Situated immediately below the drum 42 and mounted upon shaft 51 (Fig. 9) to which is fastened gear 51A, meshing with gear 41A (Figs. 5 and 6) are sprockets 52 (Figs. 9 and 4) which support a double chain conveyer 53. Conveyer 53 carries at equally spaced distances buckets 54 of the approximate shape of the bottom of the soap cake (Figs. 4 and 9). Each bucket 54 has a portion of its center slotted out 54A (Fig. 9) and this cut-away portion accommodates one of the six pads 55 carried between the sprockets 52 (particularly Fig. 9). Each pad 55 is mounted on a stem 56 which has an offset 57 moving in a cam track 58 hung upon shaft 51 (Figs. 9 and 10). The cam 58A is prevented from rotating with the shaft 51 by reason of the anchor stem 59 attached to it and held at its outer end by rod 60 mounted between the side frames of the machine (Fig. 9). The conveyer chain 53 with its buckets 54 is carried at its forward end by sprockets 61 mounted upon shaft 62 which in turn is supported by standards 63 fixed to base plate 40 (Figs. 3 and 4).

A conveyer 64 moves in the same direction as conveyer 53 (Fig. 4) coming from a point (not illustrated) where the opened tubular cartons are placed thereon in the spaces made by lugs 115 (shown in Figs. 7 and 8) for properly spacing the said cartons and preventing their collapse. The conveyer 64 travels underneath the wrapping machine (Fig. 4) and ascends so as to be almost on a level with the conveyer 53 and partially travels parallel and in unison therewith.

Standards 66 extending vertically from base 40 support a bridge piece of rectangular section 67 and on this slides a sleeve 68 which is caused to move by means of pin 69 and lever 70. (Figs. 3, 4, 5, and 6). The lever 70 is fulcrumed on stud 71 carried in bracket 72 extending outwardly from side frame 39 and said lever carries a roller stud 73 engaging with track cam 74 which is fastened to shaft 35 (Figs. 3, 5 and 6).

Suspended from sleeve 68 is a pusher 75 with a horizontally bifurcated nose-piece shaped to conform with one end of the soap cake and long enough to extend part way into the open carton 65 (Fig. 5). Provision is made for supporting a roll of wrapping paper 76 (Figs. 3, 5 and 6) and this paper is fed intermittently into position by means of feed rollers 77. A guide plate 78 supports the paper to a position over the drum 42 and under the conveyer 11 (Figs. 3 and 4, and note particularly reference character Z in Fig. 4). When the proper portion of paper has been fed into position (beneath plunger 26) (Figs. 5 and 6), it is severed from the web by suitable paper cutting mechanism. The plate 78 is of sufficient length to act as a bridge piece from the supporting belt 22 to the point where the soap cake is removed from the conveyer 11 (Figs. 3 and 4).

Figures 12, 13, 14, 15, 16:
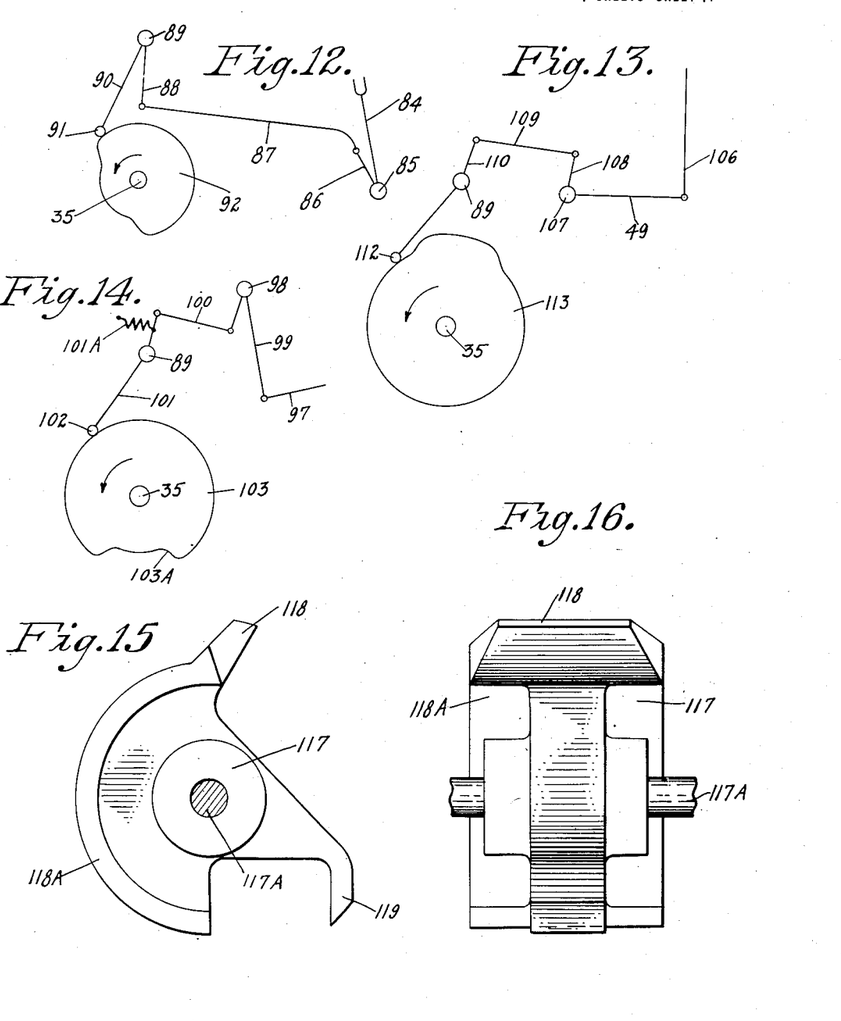
Figs. 12, 13 and 14 are diagrammatic views of the cams, levers and connecting links to control certain of the important parts of Figs. 3 and 4.
Fig. 15 is an enlarged top view of the propeller 117.
Fig. 16 is an end view of said propeller.

Two slide ways 79 extending inwardly from side frames 39 and 80 (Figs. 3, 4 and 9) support horizontal slide 81 and this carries a vertical extension on which is mounted roller fingers 82 and 83, one pair being disposed on each side of and close to drum 42 (Figs. 9 and 10). The roller fingers and the slide 81 are caused to move toward and from drum 42 by rock lever 84 (Figs. 4 and 12) fastened to shaft 85 (Figs. 3 and 4) and fastened to said shaft is lever 86 which carries one end of connecting link 87 (Figs. 3, 4 and 12). The other end of the connecting link is carried by lever 88 pivoted on shaft 89 carried in side frames 38 and 39 (Figs. 4 and 12). Lever 88 has an extension 90 on the end of which is stud 91 engaging with cam 92 mounted on shaft 35 (Figs. 4 and 12). Rotating on drum shaft 41 is the yoke piece 93 (Figs. 9 and 10). This yoke straddles the drum and can rotate about the center axis 41. The outer edge is formed into a segment 94 of slightly greater radius than that of the drum 42 (Figs. 9 and 10). The yoke has an extension 95 at one side which is connected to link 97 by pin 96 (Figs. 4, 9, 10 and 14). The other end of link 97 is carried by bell-crank 99 pivoted on fixed point 98 (Figs. 4 and 14). The other arm of bell-crank 99 connects with link 100 which is carried on the end of lever 101 mounted on shaft 89 (Fig. 14). An extension of lever 101 carries stud 102 engaging with cam 103 fixed on shaft 35 (Fig. 14). A spring 101A serves to insure positive action of the lever 101 when the drop 103A on the cam coincides with roller 102 to the effect of causing segment 94 to rotate on axis 41 (Figs. 4 and 14).

Referring to Fig. 9 particularly, a guard plate 129 is fastened at one end to underside of plate 78 and lies close to the periphery of drum 42, being fastened at its lower end to bracket 130 extending from side frame 39.

Still referring particularly to Fig. 9, the plunger 26 has a pin 27 extending transversely thereof and guided in a slot in the bracket 37. Engaging with the pin 27 is the slotted end of lever 104 fulcrumed at 105 in the extension of side frame 80 (Figs. 3 and 4). A link 106 (Figs. 4, 9, 10 and 13) is connected to lever 49 pivoted at fixed point 107; and the lever 108 connected therewith carries link 109 which is held at its other end by lever 110 mounted on shaft 89 (Fig. 13). An extension of lever 110 carries on its free end stud 112 engaging with cam 113 on shaft 35 (Fig. 13).

Figure 7:
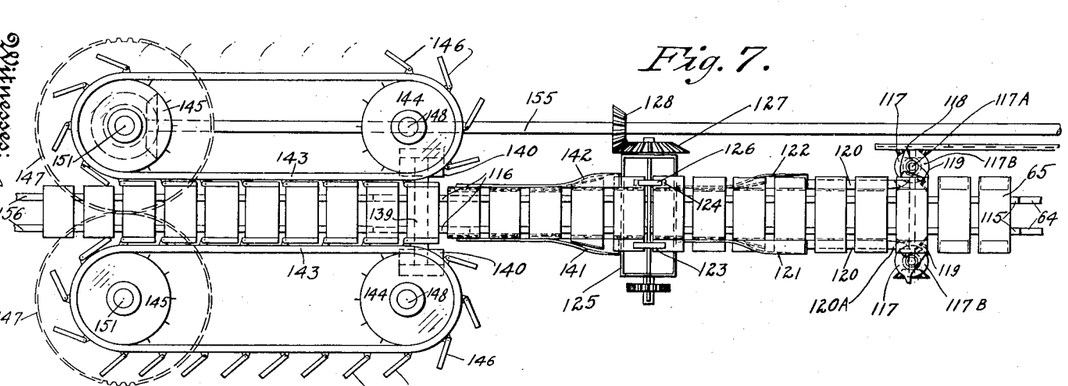
Fig. 7 is a plan view of the closing and sealing mechanism.
Figure 8:
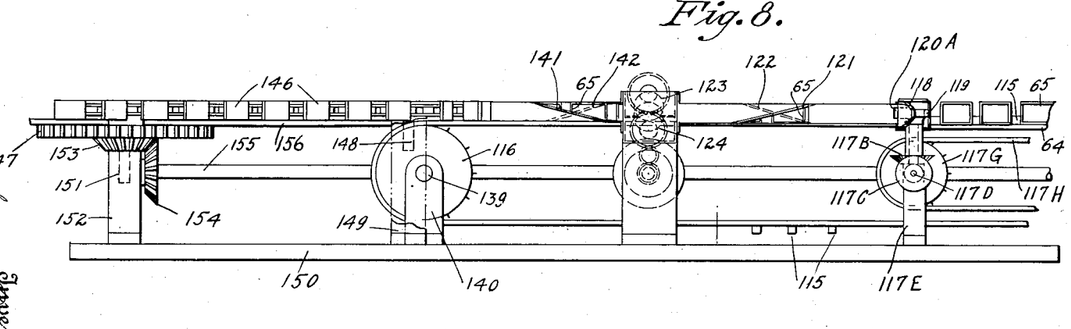
Fig. 8 is a side view of same.

Referring particularly to Figs. 7 and 8, the conveyer 64 extends from beyond the wrapping machine and partly through the closing and sealing mechanism next to be described. The conveyer 64 (hereinafter described in connection principally with Fig. 4) is carried around sprockets 116 (Figs. 7 and 8) and returns to the point (somewhere to the right of Fig. 4) where the cartons are loaded on them. The sprockets 116 are mounted on shaft 139 which is supported by the standards 140 fastened to base plate 150. As stated before, these chains act in unison with conveyer 53 of Figs. 3 and 4, and therefore move forward intermittently the space occupied by one carton.

Each of the propellers 117—117 shown on Figs. 7 and 8 is fastened to a vertical shaft 117A carried in standards 117E near each side of the conveyer 64. Each shaft 117A has fastened to it a miter gear 117B which meshes with a miter gear 117C fixed to shaft 117D mounted in standards 117E; and on the outer end of said shaft is fixed a sprocket 117G. A sprocket chain 117H engages with sprocket 117G and drives shaft 117D continuously.

As the cartons approach the propellers 117 the carton's forward side-flaps come in contact with the arms 118 (Figs. 7, 8, 15 and 16) and are deflected thereby. The further motion of the conveyer 64 carries the carton a little farther so that these deflected flaps ride past the front ends of two plows 120 (Figs. 7 and 8); and at this moment the continued rotation of each propeller 117 causes its long arm 119 (Figs. 15 and 16) to engage with the rear side flap of the carton, thus deflecting and closing it. The propeller arm 119, traveling at a slightly greater speed than the forward motion of the conveyer, 64, maintains the rear side flaps in the closed position until they are engaged by the forward nose piece of the plows 120, thus laying the two side flaps of the carton by these motions of the conveyer 64, propellers 117 and plows 120.

To permit the propeller to make a full rotation, which it does for every impulse of the conveyer 64, the nose pieces of plows 120 are cut away as shown at 120A (Figs. 7 and 8), thus permitting the long arm 119 of each propeller to pass by.

The arm 118 of each propeller is beveled somewhat smaller than the thickness of the carton to facilitate its engagement with the flap and this bevel enlarges as at 118A to a somewhat greater width than the thickness of the carton, thus spreading outwardly the top and bottom flaps while the side flaps are being folded (Figs. 15 and 16).

A farther travel of the conveyer 64 brings the carton 65 within the zone of the auxiliary plows 121 and 122. These plows are so shaped that the top flap of one end of the carton 65 will be turned downward by plow 121 and the bottom flap of the other end will be turned upward by plow 122 (Figs. 7 and 8). The carton now comes in contact with the gluing rolls 123 and 124 each mounted on its respective shaft and taking its glue supply from glue box 125 (Figs. 7 and 8). The roll 123 is designed to apply glue on the upper side of the flap extending from that end of the carton and the roller 124 to apply glue to the under side of the flap extending from that end of the carton; a pressure roller 126 being mounted immediately above the roller 124, but at a distance just sufficient to permit the extending flap of the carton to pass between them. These glue rolls are geared together so that they rotate at the same speed as the carton is being moved, and in the same direction at the points of contact with the carton flaps. The rolls take motion by means of a bevel gear 127 driven from a bevel pinion 128 fastened to shaft 155.

After the carton has passed beyond the glue box 125 the glued flap at each end comes in contact with its respective one of the plows 141 and 142; the plow 141 forcing the lower end flap upward and the plow 142 forcing the upper end flap downward; these plows being so spaced that they finally force all of the flaps of the carton at either end in close contact with each other (Figs. 7 and 8). The conveyer 64 eventually delivers the sealed carton to a point between the sealing chains 143; each of these chains being laid around sprockets 144 and 145 and carrying a series of sealing blades or wings 146 which are guided so as to press against the closed flaps at the ends of the cartons and also feed them forward while maintaining such pressure (said Figs. 7 and 8). The sprockets 145 are connected to each other by gears 147; and sprockets 144 are mounted loosely on vertical shafts 148 which are held in standards 149 fastened to base plate 150 (said Figs. 7 and 8). Sprockets 145 are fastened to upright shafts 151 which rotate in bores let-in standards 152 fastened to base plate 150. One of the shafts 151 has fastened to it a miter gear 153 which meshes with miter gear 154 fastened to shaft 155.

To support the cartons through the sealing chains 143 and beyond the conveyer 64 are fixed tracks 156.

Having thus described the structural features of this embodiment of the invention, the operation of the various mechanism thereof is substantially as follows:

Figs. 1 and 2 concerning themselves almost entirely with the feature of this embodiment wherein cakes of soap issuing from a usual machine 10 are tumbled onto the access-belt 1, therefrom to be manually transferred each into one of the bands or receptacles 20 whereby the cakes are intermittently fed toward and halted under the plunger 26 first illustrated in Figs. 3 and 4; the former figure, particularly, may be disregarded, for the purposes of the operation description, unless specifically referred to in connection therewith.

The web from the roll of paper 76 (Figs. 5 and 6) having been fed into the machine as shortly to be mentioned, and the receptacles 20 having been loaded with cakes of soap as stated in the preceding paragraph, and the carton conveyer 64 (Fig. 4) being supplied with the open cartons 65, the machine is started. The plunger 26 is right above each of the cakes of soap as it is halted thereat, and the pad 44 is supporting the under side of the paper or wrapper upon which such a cake 21 is located (Figs. 3, 4, 5, 6 and particularly Figs. 9 and 10). Cam 113 (Figs. 5, 6 and 13) on shaft 35 (Figs. 3, 4, 5, 6 and 13) causes the lever 49 to descend (Fig. 9 and particularly Fig. 10); and this, through hook 48 (Fig. 9 and particularly Fig. 10) pulls down the rod 43 and pad 44, and also causes link 106, pulling on lever 104, to depress plunger 26, which carries with it the soap cake into the adjacent recess 42A on drum 42 (Figs. 9 and 10). The downward mentioned motion of the cake of soap carries with it the just-mentioned paper wrapper 21B. This wrapper is shown in only one location in Fig. 9, for purposes of clarity, it of course being understood that when a cake 21 has been depressed as aforesaid into recess 42A it is thus inwrapped and thus remains inwrapped and indeed becomes further inwrapped, by the functioning first of the guard 129 and next by the fingers 82 (shown most clearly in Fig. 9), and as mentioned in a moment, until it is deposited as hereinafter described into one of the buckets 54. This wrapper is merely a suitably and predeterminedly cut off, as by any suitable means, length of the paper fed from roll 76 (Figs. 3, 4, 5 and 6). With the cake 21 transported only so far as a deposit thereof in said recess 42A located immediately and directly below plunger 26, the paper or wrapper is around three sides of the cake, the free sides of the paper of course projecting beyond the open opposite end of recess 42A.

Figure 11:
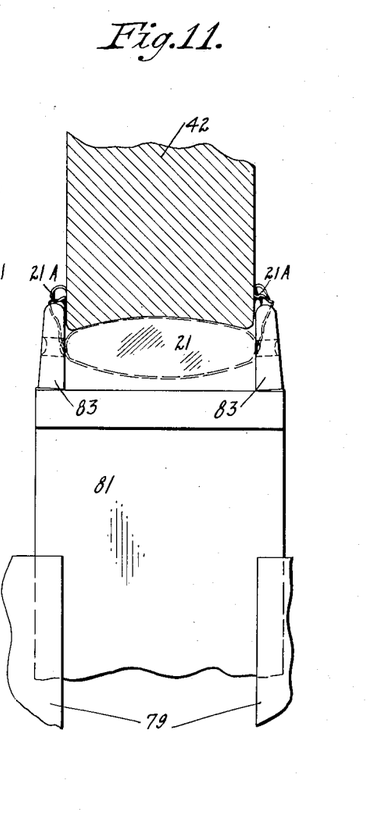
Fig. 11 is a sectional view showing the method of folding the paper around the soap cake but indicating a variation of the parts.

Cam 103 (Figs. 5, 6 and 14) on shaft 35 now causes the segment 94 (Figs. 10 and 11) to rotate around the axis of the drum 42 so that the forward edge of the segment causes the wrapper paper farther to partially infold the cake of soap, and at this moment the drum is caused to rotate at the same speed as segment 94 by reason of eccentric 34, rod 33, lever 32 and its pawl acting on ratchet wheel 36 (Fig. 4); each actuation of said pawl on said ratchet wheel causing, through the gears 41A and 51A (Figs. 3 and 6) a quarter revolution of the drum. In other words, the segment 94 continues to rotate until its forward edge is almost in contact with the guard plate 129; thereby to fold over parallel with the arcuate path of travel of the forward edge of said segment the adjacent one of said free sides of the paper or wrapper. Predeterminedly during a portion of said segment's rotation, the drum is moving in the same direction, thereby properly causing the other end of the paper to wrap around the soap by contact with the upper end of guard plate 129 and bind into place the previous or first paper fold. When the drum has rotated sufficiently to carry the cake inside of the guard 129, the position of cam 103 (Fig. 14) is such that segment 94 returns to its original position, the soap cake 21 being now wrapped in a tubular form of paper wrapper and being thus maintained while the drum completes its alloted quarter revolution. Thereupon slide 81 (Fig. 9) which is normally in a position withdrawn from the periphery of the drum (such normal position not being shown on drawings), is caused to move toward the thus relocated recess 42A, by reason of cam 92 (Fig. 12) on shaft 35 (Fig. 4) working through the links and levers connected therewith. The pair of fingers 82 and 83 on either side of the drum (Fig. 10, particularly and also Fig. 9) now engage the terminal portions which protrude beyond the side faces of the drum of the paper tube thus far established around the cake and fold said portions over at right angles to the tube proper, as shown at 21A (Figs. 9 and 11).

At the next cycle the following recess is loaded with a second cake of soap and its infolding wrapper while the first cake is carried around by the drum to the next quarter revolution halting location. As the wrapped cake is carried past the fingers 82 and 83, each lower finger 83 carrying intermediately an annular recess as shown at 83A in Fig. 9 cut away to permit the edge of maximum dimension of the cake (see the reference numeral 21X in Fig. 9) to pass within said recess the full portions of said fingers have been found to have a tendency to bunch the adjacent folded end into a compressed, substantially self-maintaining conical form.

When the thus wrapped cake has been transported just beyond the bracket 130, and when, on the subsequent predetermined halting of the drum, it has reached the location marked 21K, the ensuing depression as aforesaid of plunger 26 with reference to a third cake of soap thereunder is simultaneous with a descent of the rod 43 (its intermediate yoke purposes permitting it to travel relatively of the shaft 41), brought about by the predetermined actuation as aforesaid of hook 48, and this causes pad 44 on said rod's lowermost end to expel the wrapped or "first" cake 21K from its recess 42 and into one of the buckets 54; but to prevent the cake from being disturbed as the drum carries it beyond the bracket 130 the one of the pads 55 which is approaching the crest of the cam 58 causes the said pad 55 to support the cake in its now open-bottomed recess 42A until the instant the rod 43 is depressed as just mentioned, when the extension 57 on the supporting rod 56 of pad 55 rides off the said crest of the cam 58. By this means, complete control is had over the cake in its descent into the bucket 54 carried on conveyer 53. As the conveyer 53 receives its impulse from sprockets 52 fastened to the shaft 51, which in turn is controlled by the lever 32 (Fig. 4), said conveyer 53 acts in unison with drum 42 by reason of the gears aforesaid 41A and 51A fixed on the respective shafts 41 and 51.

The successive cycles will carry each successive paper-infolded cake on conveyer 53 (Figs. 3 and 4) to a point beneath the slide 68 (Figs. 3, 4, 5 and 6). A properly spaced and set-up series of cartons having been properly and as aforesaid fed to the conveyer 64 at a point ahead of the right-hand end of said conveyer in Fig. 4, an open carton 65 on conveyer 64 (see Fig. 4 particularly, and also Fig. 5) is now in position under slide 66 and in transverse line (note the reference numerals 21, 54 and 75 in the center of Fig. 5) with the paper wrapped cake in its bucket 54. The nose 75 of plunger 68 at this instant is in a position to the right of the cake 21 shown in Fig. 5.

The nose 75 (see the cam 74) immediately engages with the cake, and forces the latter into the tube of the carton, the upper tine of the nose 75 infolding into the open carton the right hand bunched folded end of the wrapper and the edge of the upper flap of the carton folding over forward or left-hand similar end of the wrapper, thus laying over the paper in a complete wrapping of the cake and at the same time inserting it into the open carton.

The same successive cycles now carry the loaded carton on conveyer 64 to the flap closing devices shown in Figs. 7 and 8, the propellers 117 and plows 120 acting to close the two side flaps at each end of the carton. The plows 121 and 122 then serve, one to fold a top flap at one end of the carton down and the other a bottom flap at the other end down up; thus preparing the carton to pass by the gluing devices 123 and 124 for applying glue to the remaining top or bottom flap at each end. Farther travel of the carton brings these extending and glued flaps under the action of the plows 141 and 142 to close them on to the other flaps, whereupon the glued and closed carton is delivered to the sealing chains 143, whose wings 146 serve to keep a pressure on each end of the carton for a sufficient time to insure the proper adhesion of the glued flaps.

The shaft 35, Figs. 3 and 4, is rotating continuously as is also the sprocket 117G which drives the propellers 117 (Figs. 7, 8, 15 and 16). The ratchet wheel 36 (Fig. 4)

imparts an intermittent motion to the supporting belt 22 and conveyer 11 (Figs. 3 and 4) and to the conveyer 53 (Figs. 4, 9 and 10) and may also be connected to operate conveyer 64 (Figs. 4, 5 and 8), and the shaft 155 (Figs. 7 and 8) which drives the gluing device and the sealing chains 143 (Figs. 7 and 8).

The means for feeding and cutting the paper used for wrapping around the cake follows conventional lines and need not be explained in any other way than that its feed is in unison with the other functions of the machine.

Inasmuch as many changes could be made in the above construction, and many apparently widely different embodiments of my invention could be made without departing from the scope thereof, it is intended that all matter contained in the above description or shown in the accompanying drawings shall be interpreted as illustrative and not in a limiting sense.

It is also to be understood that the language used in the following claims is intended to cover all the generic and specific features of the invention herein described and all statements of the scope of the invention which, as a matter of language, might be said to fall therebetween.

I claim:—

1. In a machine for wrapping oval shaped pieces, the combination of a traveling conveyer with receptacles open top and bottom, a supporting belt traveling underneath the conveyer to maintain the pieces in place, and a plunger for removing the pieces from the open receptacles of the conveyer.

2. In a machine for wrapping oval shaped pieces, the combination of a traveling conveyer with receptacles open top and bottom, a supporting belt traveling underneath the conveyer to maintain the pieces in place, a supporting plunger, and a depressing plunger co-acting with the supporting plunger for removing the pieces from the open receptacles of the conveyer.

3. In a machine for wrapping oval shaped pieces, the combination of a traveling conveyer with receptacles open top and bottom, a supporting belt traveling underneath the conveyer to maintain the pieces in place, a supporting plunger, a depressing plunger co-acting with the supporting plunger for removing the pieces from the open receptacles of the conveyer, a recessed rotating drum, said recesses conforming to the shape of the pieces, said conveyer and said drum being predeterminedly halted at predetermined intervals and during each of said intervals said plunger being actuated.

4. In a machine for wrapping oval shaped pieces, the combination of a traveling conveyer with receptacles open top and bottom, a supporting belt traveling underneath the conveyer to maintain the pieces in place, a supporting plunger, a depressing plunger co-acting with the supporting plunger for removing the pieces from the open receptacles of the conveyer, a recessed rotating drum, said recesses conforming to the shape of the pieces, said conveyer and said drum being predeterminedly halted at predetermined intervals and during each of said intervals said plunger being actuated, and a rotating paper folding blade moving in unison with a rotary movement of the drum.

5. In a machine for wrapping oval shaped pieces, the combination of a traveling conveyer with receptacles open top and bottom, a supporting belt traveling underneath the conveyer to maintain the pieces in place, a supporting plunger, a depressing plunger co-acting with the supporting plunger for removing the pieces from the open receptacles of the conveyer, a recessed rotating drum, said recesses conforming to the shape of the pieces, said conveyer and said drum being predeterminedly halted at predetermined intervals and during each of said intervals said plunger being actuated, and a fixed paper folding guide conforming to the circumference of the drum.

6. In a machine for wrapping oval shaped pieces, the combination of a traveling conveyer with receptacles open top and bottom, a supporting belt traveling underneath the conveyer to maintain the pieces in place, a supporting plunger, a depressing plunger co-acting with the supporting plunger for removing the pieces from the open receptacles of the conveyer, a recessed rotating drum, said recesses conforming to the shape of the pieces, said conveyer and said drum being predeterminedly halted at predetermined intervals and during each of said intervals said plunger being actuated, a rotating paper folding blade moving in unison with a rotary movement of the drum, and a fixed paper folding guide conforming to the circumference of the dial.

7. In a machine for wrapping oval shaped pieces, the combination of means to support said piece and to fold a paper in tubular form about the piece, another support for said piece, means for transferring said piece from the first support to the second, and devices to prevent dislocation of the said piece relatively of its tubular wrapper during such transfer, and conical end folders for laying over the end folds of the tubular wrapping.

8. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, and means for feeding the loaded carton past said folders.

9. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, and means adapted to actuate said folders to fold the side end-flaps of the carton.

10. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, means adapted to actuate said folders to fold the side end-flaps of the carton, and means for simultaneously folding one upper end-flap down and one opposite lower end-flap up.

11. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, means adapted to actuate said folders to fold the side end-flaps of the carton, means for simultaneously folding one upper end-flap down and one opposite lower end-flap up, and means for applying glue simultaneously to the inner surfaces of the two remaining upper and lower end-flaps.

12. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, means adapted to actuate said folders to fold the side end-flaps of the carton, means for simultaneously folding one upper end-flap down and one opposite lower end-flap up, means for applying glue simultaneously to the inner surfaces of the two remaining upper and lower end-flaps, and means for simultaneously folding over the opposite glued flaps upon the other flaps at either end of the carton.

13. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, means adapted to actuate said folders to fold the side end-flaps of the carton, means for simultaneously folding one upper end-flap down and one opposite lower end-flap up, means for applying glue simultaneously to the inner surfaces of the two remaining upper and lower end-flaps, means for simultaneously folding over the opposite glued flaps upon the other flaps at either end of the carton, and a conveyer adapted thereupon to receive said carton to convey the same while maintaining pressure upon the ends of the carton during the setting of the glue.

14. In a machine for wrapping oval shaped pieces, in combination, means for transporting to a predetermined location a carton open at both ends, and means adapted for transporting to another predetermined location an oval shaped piece which has been wrapped in paper, said locations being such that one of the longitudinal center lines of said carton and piece is substantially in prolongation of the other, means for carrying the oval piece into the open carton and adapted thereby to fold over the free ends of the paper wrapping, a pair of spaced end-flap folders, means for feeding the loaded carton past said folders, means adapted to actuate said folders to fold the side end-flaps of the carton, means for simultaneously folding one upper end-flap down and one opposite lower end-flap up, means for applying glue simultaneously to the inner surfaces of the two remaining upper and lower end-flaps, means for simultaneously folding over the opposite glued flaps upon the other flaps at either end of the carton, and a conveyer adapted thereupon to receive said carton to convey the same while maintaining pressure upon the ends of the carton during the setting of the glue, said conveyer also serving to feed the closed carton out of the said machine.

15. In a machine for wrapping oval shaped pieces, in combination, a traveling conveyer with receptacles open top and bottom, a supporting belt traveling with and underneath said conveyer, means for halting said conveyer and said belt predeterminedly, means thereupon acting to fold a wrapper about three sides of a cake while simultaneouly removing the cake from its receptacle.

16. In a machine for wrapping oval shaped pieces, in combination, a traveling conveyer with receptacles open top and bottom, a supporting belt traveling with and underneath said conveyer, means for halting said conveyer and said belt simultaneously, means thereupon acting to fold a wrapper about three sides of a cake while simultaneously removing the cake from its receptacle, and means for thereafter folding the paper over the remaining side of the cake and including one movable and one fixed folder.

17. In a machine for wrapping oval shaped pieces, in combination, a traveling conveyer with receptacles open top and bottom, a supporting belt traveling with and underneath said conveyer, means for halting said conveyer and said belt simultaneously, means thereupon acting to fold a wrapper about three sides of a cake while simultaneously removing the cake from its receptacle, and means for thereafter folding the paper over the remaining side of the cake and including one movable and one fixed folder, the means last-mentioned functioning with reference to the cake first-mentioned while a succeeding cake is having a wrapper as aforesaid folded about three of its sides.

18. In a machine for wrapping oval shaped pieces, in combination, a traveling conveyer with receptacles open top and bottom, a supporting belt traveling with and underneath said conveyer, means for halting said conveyer and said belt simultaneously, means thereupon acting to fold a wrapper about three sides of a cake while simultaneously removing the cake from its receptacle, and means for thereafter folding the paper over the remaining side of the cake and including one movable and one fixed holder, the means last-mentioned functioning with reference to the cake first-mentioned while a succeeding cake is having a wrapper as aforesaid folded about three of its sides, the means last-mentioned functioning with reference to the cake first-mentioned while a preceding cake is being further inwrapped, there being present further inwrapping means adapted to fold over the end-edges of the wrapper of said preceding cake.

19. In a machine for wrapping oval shaped pieces, in combination, a traveling conveyer with receptacles open top and bottom, a supporting belt traveling with and underneath said conveyer, means for halting said conveyer and said belt simultaneously, means thereupon acting to fold a wrapper about three sides of a cake while simultaneously removing the cake from its receptacle, and means for thereafter folding the paper over the remaining side of the cake and including one movable and one fixed folder, the means last-mentioned functioning with reference to the cake first-mentioned while a succeeding cake is having a wrapper as aforesaid folded about three of its sides, the means last-mentioned functioning with reference to the cake first-mentioned while a preceding cake is being further inwrapped, there being present further inwrapping means adapted to fold over the end-edges of the wrapper of said preceding cake, and means admitted for functioning simultaneously with the two means last-mentioned thereby to introduce a further preceding cake into a carton open at both ends.

20. In a wrapping machine, the combination of a recessed rotating drum, means for feeding thereto articles that are wrapped simultaneously with their transfer on three sides, means for transporting to a predetermined location an open ended carton, and means for carrying the partially wrapped article into the carton and thereby folding the paper over the remaining portions of the article.

21. In a wrapping machine, the combination of a recessed rotating drum, means for feeding thereto articles that are wrapped simultaneously with their transfer on three sides, means for transporting to a predetermined location an open ended carton, and means for carrying the partially wrapped article into the carton and thereby further inwrapping said article.

22. In a wrapping machine, the combination of a recessed rotating drum, means for feeding thereto articles that are wrapped simultaneously with their transfer on three sides, means for transporting to a predetermined location an open ended carton, means for carrying the partially wrapped article into the carton and thereby folding the paper over the remaining side of the article and further inwrapping means for folding over the end edges of the wrapper.

23. In a machine for wrapping articles, the combination of a traveling conveyer with receptacles open top and bottom, a supporting belt traveling underneath the conveyer to maintain the pieces in place and a reciprocatory means for removing the pieces from the open receptacles of the conveyer.

24. In a combined wrapping and packaging machine, comprising a recessed rotating drum, means for feeding thereto a partially wrapped article, means associated with said drum for inclosing the articles on three sides within its wrapper, means for transporting to a predetermined location an open ended carton, means for transferring said wrapped article from the drum into alinement with said carton and means for inserting the so wrapped article within the carton thereby further folding the wrapper about the article.

25. In a combined wrapping and packaging machine, comprising a recessed rotating drum, means for feeding thereto a partially wrapped article, means associated with said drum for inclosing the article on three sides within its wrapper, means for transporting to a predetermined location an open ended carton, means for transferring said wrapped article from the drum into alinement with said carton, means for inserting the so wrapped article within the carton, thereby folding the wrapper about the article, and means for sealing the carton.

26. In a combined wrapping and packaging machine, comprising a recessed rotating drum, means for feeding thereto a partially wrapped article, means associated with said drum for inclosing the article on three sides within its wrapper, a conveyer, means for transferring the so wrapped article from the drum to said conveyer, means for transporting to a predetermined position an open ended carton, and means for inserting the so wrapped article within the carton, thereby completing the folding of the wrapper about the article.

27. In a combined wrapping and packaging machine, comprising a recessed rotating drum, means for feeding thereto a partially wrapped article, means associated with said drum for inclosing the article on three sides within its wrapper, a conveyer, means for transferring the wrapped article from the drum to said conveyer, means for transporting to a predetermined position an open ended carton, means for inserting the so wrapped article within the carton, thereby completing the folding of the wrapper about the article, and means for sealing the carton.

28. In a combined wrapping and packaging machine, comprising a recessed rotating drum, means for feeding thereto a partially wrapped article, means associated with said drum for inclosing the article on three sides within its wrapper, a pocketed conveyer, means for transferring the so wrapped article from the drum to a pocket in said conveyer, an open carton and means for inserting the wrapped article within the carton, thereby completing the folding of the wrapper about the article.

In testimony whereof I affix my signature.

SIMON COOPER.